(12) United States Patent
Moon et al.

(10) Patent No.: US 8,345,280 B2
(45) Date of Patent: Jan. 1, 2013

(54) IMAGE FORMING APPARATUS AND METHOD TO SEARCH FOR AND PRINT IMAGES ON NETWORK

(75) Inventors: Chong-ho Moon, Suwon-si (KR); In-sung Choi, Seoul (KR)

(73) Assignee: SAMSUNG Electronics Co., Ltd., Suwon-si (KR)

(*) Notice: Subject to any disclaimer, the term of this patent is extended or adjusted under 35 U.S.C. 154(b) by 941 days.

(21) Appl. No.: 11/541,529

(22) Filed: Oct. 3, 2006

(65) Prior Publication Data

US 2007/0153319 A1    Jul. 5, 2007

(30) Foreign Application Priority Data

Jan. 4, 2006   (KR) .................. 10-2006-0000937

(51) Int. Cl.
- *G06F 3/12* (2006.01)
- *G06F 15/16* (2006.01)
- *G06F 7/00* (2006.01)
- *G06K 15/02* (2006.01)
- *G06K 15/00* (2006.01)
- *G06K 9/54* (2006.01)
- *H04N 1/60* (2006.01)

(52) U.S. Cl. ........ 358/1.15; 358/1.2; 358/1.9; 358/1.18; 382/305; 709/219; 707/709

(58) Field of Classification Search .................. 358/1.15, 358/1.2
See application file for complete search history.

(56) References Cited

U.S. PATENT DOCUMENTS

| | | | |
|---|---|---|---|
| 5,764,235 A * | 6/1998 | Hunt et al. .................. 345/428 |
| 6,771,382 B1 * | 8/2004 | Misawa et al. .............. 358/1.15 |
| 6,839,461 B2 * | 1/2005 | Tomomatsu .................. 382/170 |
| 6,934,048 B2 * | 8/2005 | Igarashi et al. .............. 358/1.15 |
| 7,145,679 B2 * | 12/2006 | Hitaka ........................ 358/1.15 |
| 7,148,989 B2 * | 12/2006 | Hitaka ........................ 358/1.16 |
| 7,253,919 B2 * | 8/2007 | Hull et al. ................... 358/1.18 |
| 7,271,928 B2 * | 9/2007 | Naito et al. .................. 358/1.15 |
| 7,456,991 B2 * | 11/2008 | Lay et al. .................... 358/1.16 |
| 2002/0069239 A1 * | 6/2002 | Katada et al. ................ 709/202 |
| 2002/0093681 A1 * | 7/2002 | Hitaka ........................ 358/1.15 |
| 2002/0186382 A1 * | 12/2002 | Gonzalez et al. ............. 358/1.2 |
| 2003/0048470 A1 * | 3/2003 | Garcia ........................ 358/1.15 |
| 2004/0066531 A1 * | 4/2004 | Kim ............................ 358/1.15 |
| 2004/0066536 A1 * | 4/2004 | Takamine et al. ........... 358/1.15 |
| 2004/0109197 A1 * | 6/2004 | Gardaz et al. ............... 358/1.15 |
| 2005/0024682 A1 * | 2/2005 | Hull et al. ................... 358/1.18 |
| 2006/0072139 A1 * | 4/2006 | Hult et al. ................... 358/1.13 |

FOREIGN PATENT DOCUMENTS

| | | |
|---|---|---|
| JP | 10-016354 | 1/1998 |
| JP | 11-316672 | 11/1999 |
| KR | 2002-21251 | 3/2002 |

* cited by examiner

*Primary Examiner* — Hilina S Kassa

(74) *Attorney, Agent, or Firm* — Stanzione & Kim, LLP (57) ABSTRACT

An image forming apparatus includes an input unit to receive a network resources address where a document exists, a web information receiving unit to read information on the document existing at the received address, an image path extracting unit to extract a path and a name of an image file consistent with predetermined reference data from the document information, an image receiving unit to receive the image file through the network using the extracted path and name of the image file, and a printing unit to print the image file.

36 Claims, 7 Drawing Sheets

IMAGE FORMING APPARATUS AND METHOD TO SEARCH FOR AND PRINT IMAGES ON NETWORK

CROSS-REFERENCE TO RELATED APPLICATIONS

This application claims priority under 35 U.S.C. §119(a) from Korean Patent Application No. 2006-937, filed Jan. 4, 2006 in the Korean Intellectual Property Office, the contents of which are incorporated herein by reference in its entirety.

BACKGROUND OF THE INVENTION

1. Field of the Invention

The present general inventive concept relates to an image forming apparatus and a method to search for and print images on a network. More particularly, the present general inventive concept relates to an image forming apparatus and a method to search for and print images on a network, capable of selecting and displaying the images linked to web pages based on predetermined reference data and printing desired images of the selected and displayed images.

2. Description of the Related Art

Figure 1:
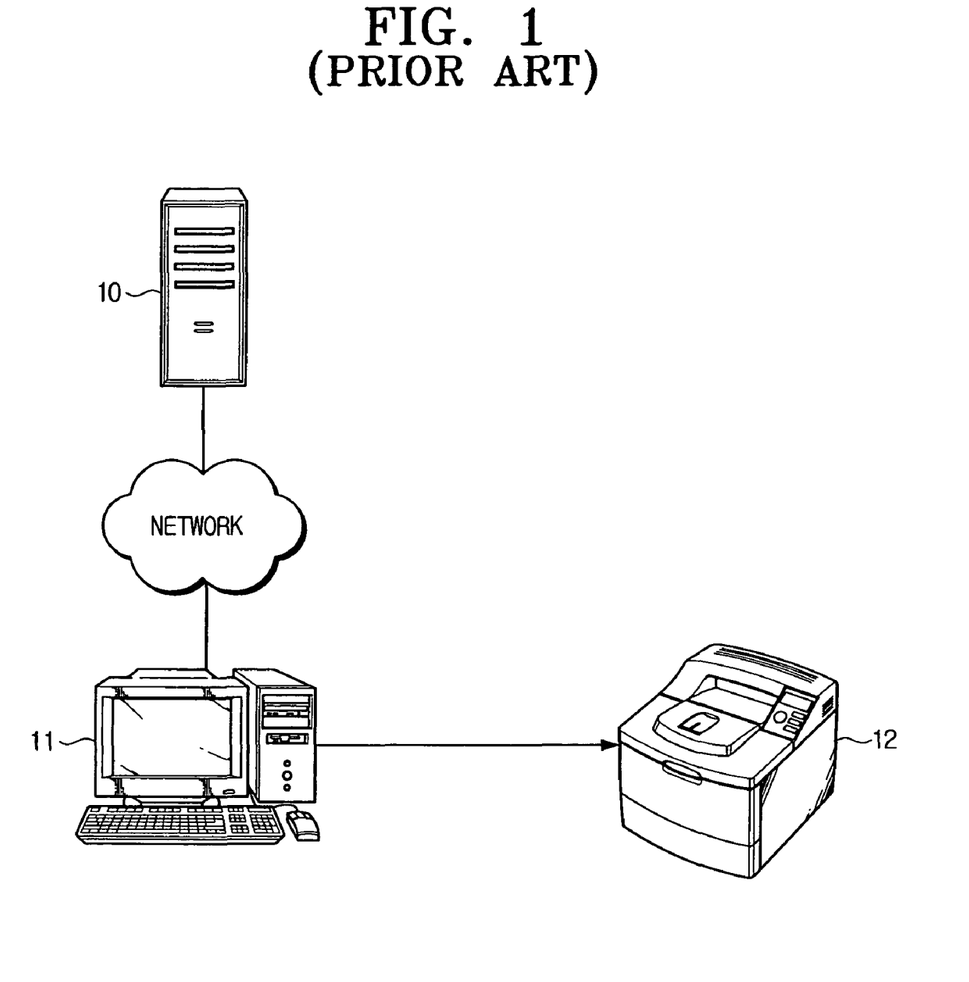
FIG. 1 is a view illustrating a conventional method of printing images existing on a network.

FIG. 1 is a view illustrating a conventional method of printing images existing on a network.

Conventionally, a user searches for web pages existing in a certain server 10 through a network using a host 11, selects desired images out of images linked to the web pages, and downloads the selected images to the host 11. If the user sends the downloaded images to a printer 12, the printer 12 prints the received images.

In order to print the images existing on a network, the user must search for web pages containing images as well as diverse information through the host 11. That is, there exists inconvenience since the user checks images linked to a web page one by one and then sends them to the printer 12.

SUMMARY OF THE INVENTION

The present general inventive concept provides an image forming apparatus and a method to search and print images on networks, capable of selecting and displaying the images linked to web pages based on predetermined reference data and printing desired images of the selected and displayed images.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of searching for and printing images on a network in an image forming apparatus, the method including receiving a network resources address at which a document exists, reading information on the document existing at the received address, extracting a path and a name of an image file consistent with predetermined reference data from the document information, receiving the image file through the network using the extracted path and name of the image file, and printing the image file.

The address may include a uniform resource locator (URL).

The receiving of the network resource address can include receiving the address through an input unit provided on either the image forming apparatus or a host connected to the image forming apparatus to control the image forming apparatus.

The document information can include a web language source encoding the document.

The reference data may include at least one of an image size and an image file size.

The method may further include receiving the reference data through an input unit provided on either the image forming apparatus or a host connected to the image forming apparatus to control the image forming apparatus.

The image file may include a plurality of image files, the receiving of the image file may include displaying the received image files, and selecting one of the displayed image files to be printed, and the printing of the image file includes printing the selected image file.

The foregoing and/or other aspects and utilities of the present general inventive concept may also be achieved by providing an image forming apparatus, including an input unit to receive a network resources address at which a document exists, a web information receiving unit to read in information on the document existing at the received address, an image path extracting unit to extract a path and a name of an image file consistent with predetermined reference data from the document information, an image receiving unit to receive the image file through the network using the extracted path and name of the image file, and a printing unit to print the image file.

The address can include a uniform resource locator (URL).

The document information may include a web language source encoding the document.

The apparatus may further include a reference data storage unit to store the reference data as a reference to extract the path and name of the image file.

The reference data may include at least one of an image size and an image file size.

The input unit can receive the reference data.

The apparatus may further include a display unit to display the received image file, and the input unit may receive a selected image file of the displayed image files to be printed and the printing unit may print the selected image file.

The foregoing and/or other aspects and utilities of the present general inventive concept may also be achieved by providing an image forming apparatus, including a web information unit to obtain information on a document located at an input web address through a network, and an image path extracting unit to extract a path and a name of one or more image files in the document according to the document information obtained by the web information unit.

The information may include a web language source encoding the document. The information may include a web page of the input web address and a source of a web language that constructs the web page. The image path extracting unit may select at least one image file of the one or more image files using predetermined reference data, and may extract the path and the name of the selected at least one image file.

The image forming apparatus may further include a storage unit to store the predetermined reference data. The predetermined reference data may include predetermined image file criteria such that image files that do not satisfy the predetermined image file criteria are excluded from being selected by the image path extracting unit. The predetermined image file criteria may include a predetermined image file size range. The predetermined reference data may include predetermined image criteria such that image files having images that do not satisfy the predetermined image criteria are excluded from being selected by the image path extracting unit. The predetermined image criteria may include a predetermined image size range.

The image forming apparatus may further include an image receiving unit to receive the one or more image files through the network using the path and name extracted by the image path extracting unit. The image forming apparatus may further include a display unit to display one or more images corresponding to the one or more image files received by the image receiving unit. The image forming apparatus may further include a printing unit to print one or more images corresponding to the one or more image files received by the image receiving unit. The image forming apparatus may further include an input unit to generate an interface to select reference data corresponding to at least one of an image size and an image file size, and the image patch extracting unit may select one or more image files according to the reference data.

The foregoing and/or other aspects and utilities of the present general inventive concept may also be achieved by providing a method of receiving an image through a network using an image forming apparatus, the method including obtaining information on a document located at an input web address through the network, extracting a path and a name of one or more image files in the document from the information obtained by the web information unit, and receiving the one or more image files through the network using the path and name extracted by the image path extracting unit.

The information may include a web language source encoding the document. The extracting of the path and name may include selecting at least one image file of the one or more image files using predetermined reference data, and extracting the path and the name of the selected at least one image file.

The method may further include storing the predetermined reference data. The predetermined reference data may include predetermined image file criteria, and the selecting of the at least one image file may include selecting at least one image file of the one or more image files that satisfies the predetermined image file criteria. The image file criteria may include a predetermine image file size range, and the selecting of the at least one image file may include selected at least one image file having a size within the predetermined image file size range. The predetermined reference data may include predetermined image criteria, and the selecting of the at least one image file may include selecting at least one image file of the one or more image files having an image that satisfies the predetermined image criteria. The image criteria may include a predetermine image size range, and the selecting of the at least one image file may include selected at least one image file having an image having a size within the predetermined image size range.

The method may further include displaying one or more images corresponding to the received one or more image files. The method may further include printing one or more images corresponding to the received one or more image files.

The foregoing and/or other aspects and utilities of the present general inventive concept may also be achieved by providing a computer readable recording medium including a computer readable code to perform a method of receiving an image through a network using an image forming apparatus, the method including obtaining information on a document located at an input web address through the network, extracting a path and a name of one or more image files in the document from the information obtained by the web information unit, and receiving the one or more image files through the network using the path and name extracted by the image path extracting unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
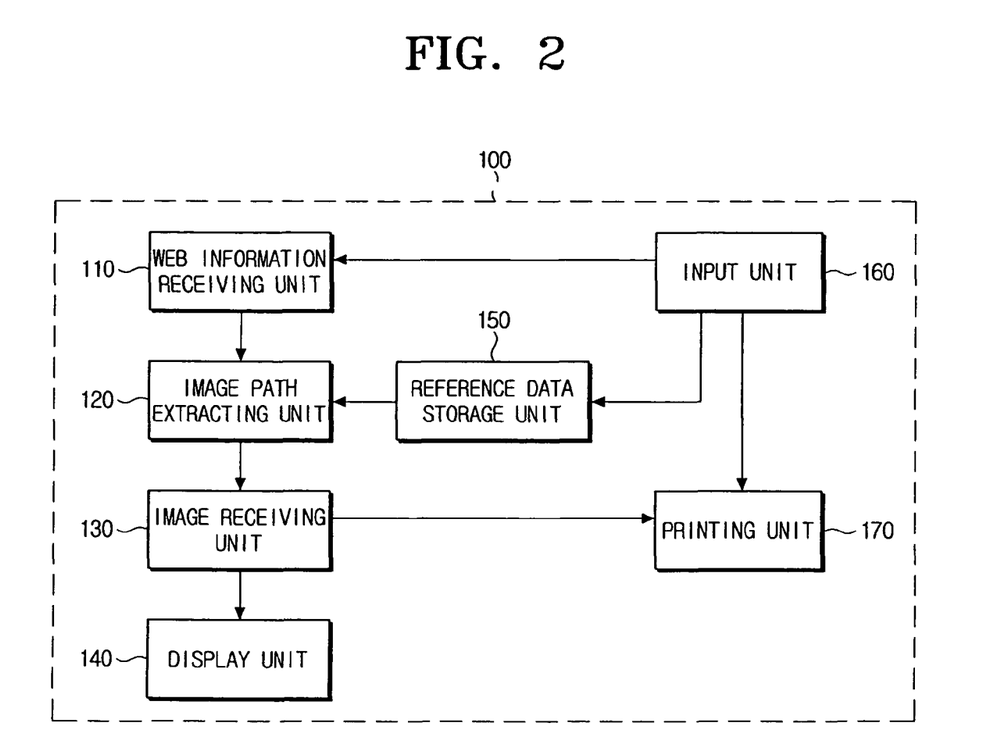
FIG. 2 is a functional block diagram illustrating a configuration of an image forming apparatus according to an embodiment of the present general inventive concept.

FIG. 2 is a functional block diagram illustrating a configuration of an image forming apparatus 100 according to an embodiment of the present general inventive concept.

The image forming apparatus 100 includes a web information receiving unit 110, an image path extracting unit 120, an image receiving unit 130, a display unit 140, a search reference data storage unit 150, an input unit 160, and a printing unit 170.

The web information receiving unit 110 reads, through a network, information on a document existing at a web address input to the input unit 160. Alternatively, the web address can be input through an input unit provided by a host (not illustrated) that controls the image forming apparatus 100 and sent to the image forming apparatus 100. The information on the document can be a web language source, such as HTML, encoding the document.

The image path extracting unit 120 extracts a path and name of an image file existing in the document from the information on the document read by the web information receiving unit 110. Further, the image path extracting unit 120 can select an image file matching reference data stored in the reference data storage unit 150 and extract the path and name of the selected image file.

The reference data storage unit 150 stores data, which is referred to as "reference data" hereinafter, that become a reference when the image path extracting unit 120 selects the image file and extracts the path and name of the image file. The reference data can be an image size, an image file size, or the like. The reference data may be, for example, a reference to exclude images that are in a range a user does not desire, such as images that are too big or too small.

The image receiving unit 130 receives a corresponding image file through a network, using the path and name extracted by the image path extracting unit 120.

The display unit 140 displays the image file received by the image receiving unit 130.

The input unit 160 has at least one operation button to receive various user commands, which can be, for example, an operation panel (OPE). The input unit 160 receives addresses of resources on the network at which the document containing user-desired images are located. The address of resources on a network can be, for example, a URL (Uniform Resource Locator). Further, the input unit 160 can receive the reference data.

The input unit 160 can receive the selected image file to be printed out of the displayed image files.

The printing unit 170 performs a print job with the image file.

Figure 3:
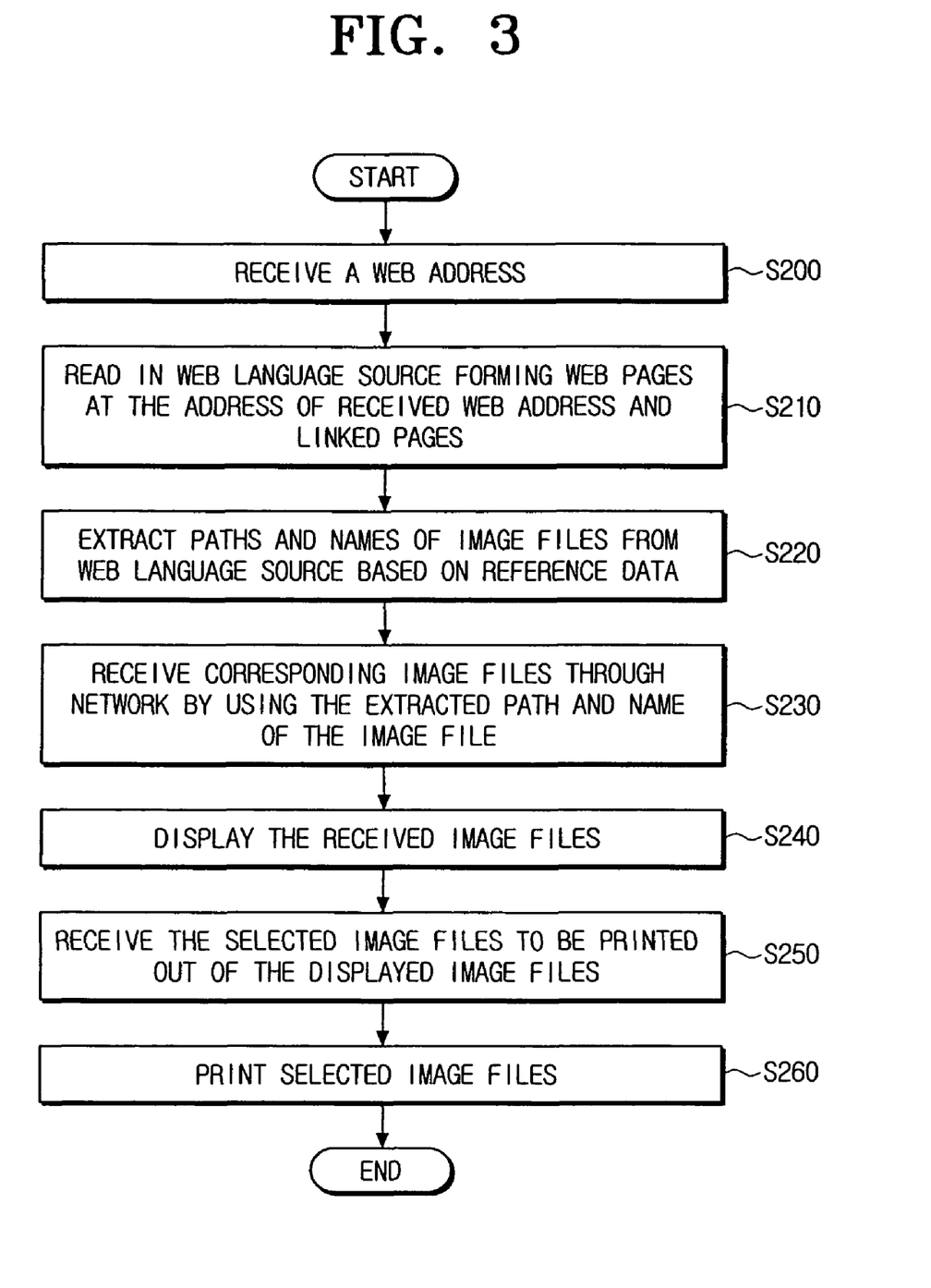
FIG. 3 is a flowchart illustrating a method of printing images according to an embodiment of the present general inventive concept.
Figure 5A:
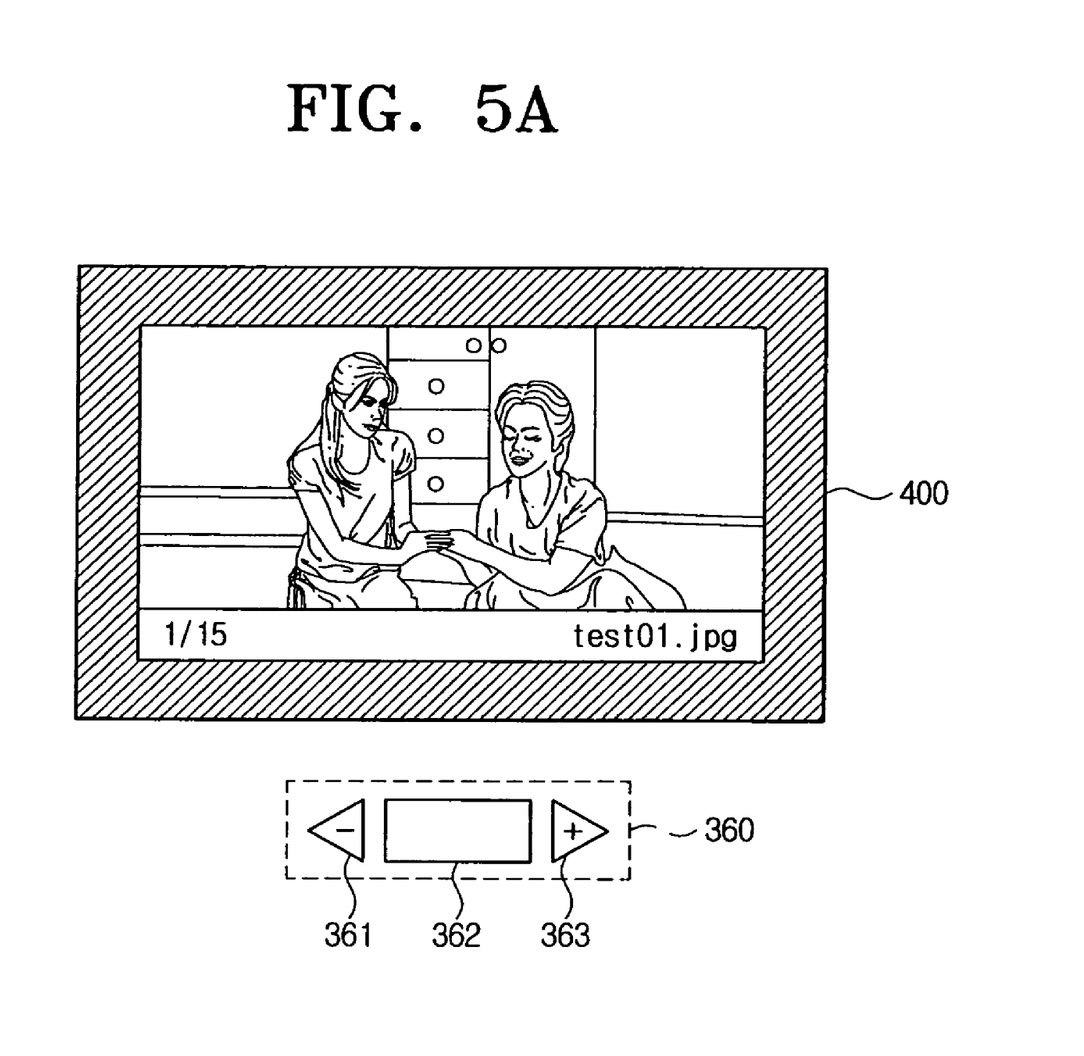
FIG. 5A and FIG. 5B are views illustrating an operation panel according to an embodiment of the present general inventive concept useable in the method of FIG. 3.
Figure 5B:
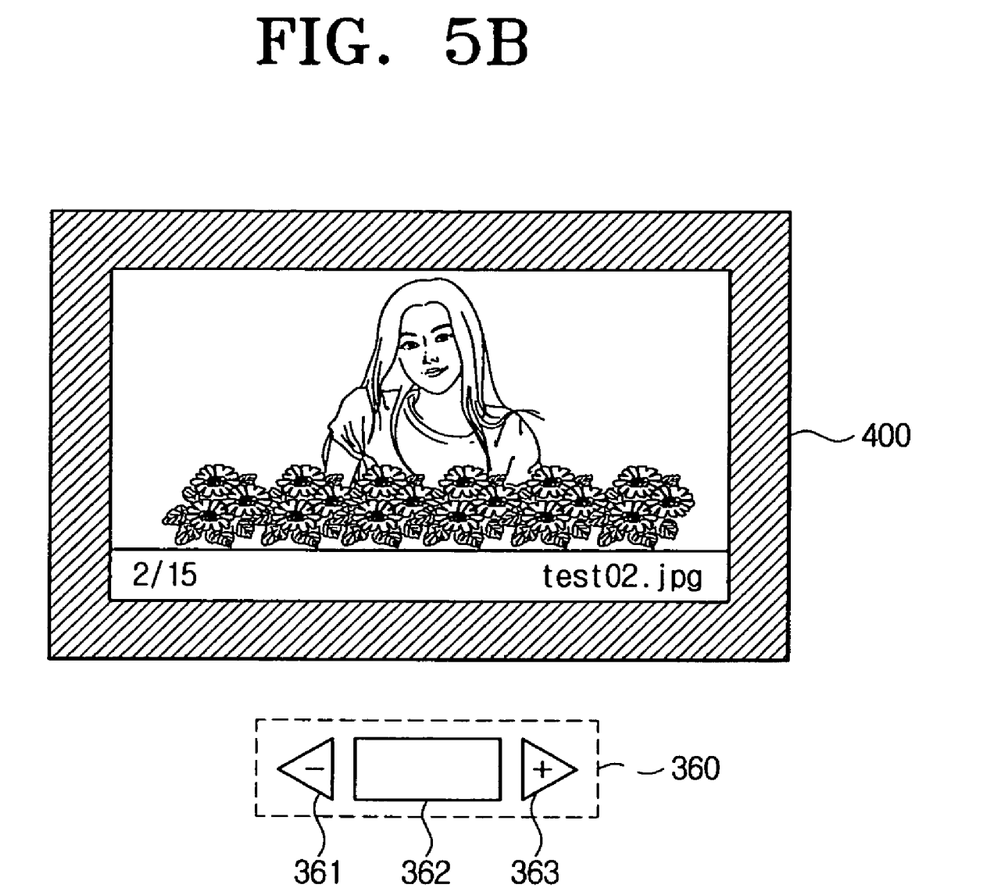

FIG. 3 is a flow chart illustrating a method of printing images according to an embodiment of the present general inventive concept, and FIGS. 5A and 5B are views illustrating a method of printing images according to an embodiment of the present general inventive concept. Hereinafter, description will be made with reference to FIGS. 2, 3, 5A and 5B.

The input unit 160 receives a web address (operation S200). Alternatively, a web address can be input through an input unit provided on a host (not illustrated) to control the image forming apparatus 100, and transmitted to the image forming apparatus 100. The web address is generally denoted as a URL (Uniform Resource Locator), which represents a location of resources on a network.

The web information receiving unit 110 reads in through a network a source of a web language that constructs the web pages of the input web address (operation S210). The web information receiving unit 110 can read in the web pages at the input web address as well as the source of the web language that constructs pages linked to the web pages. For example, HTML sources of a web page can be read by the web information receiving unit 110.

The image path extracting unit 120 extracts a path and name of an image file from the source of the web language read in at operation S210 (operation S220). Description will be made using the following HTML source as an example:

<IMG SRC="anm17.gif">.

If the image path extracting unit 120 comes across a keyword of 'IMG' in the HTML source read in at operation S210, the image path extracting unit 120 can recognize the corresponding portion as an image file. Alternatively, through 'gif' being an extension of a file name, the image path extracting unit 120 can recognize the corresponding portion as an image file. Extensions of an image file include gif, jpg, jpeg, bmp, and on the like. In the above example, the path to the image file is consistent with the path to the HTML source file, and the name of the image file is anm17.gif.

Further, the image path extracting unit 120 can extract the path and name of the image file consistent with the reference data stored in the reference data storage unit 150. The reference data can be, for example, an image size or an image file size. Description will be made of a method of selecting an image file based on an image size using the following HTML source as an example:

<IMG SRC="anm18.gif" WIDTH=200 HEIGHT=200>.

If the image path extracting unit 120 comes across a keyword of 'WIDTH' or 'HEIGHT' after coming across a keyword of 'IMG' in the HTML source read in at operation S210, the image path extracting unit 120 performs a comparison with a range of image sizes stored in the reference data storage unit 150, and determines whether to extract the path and name of the image file of anm18.gif. If the image size appearing in the HTML source is within the range of the image sizes stored in the reference data storage unit 150, the image path extracting unit 120 extracts the path and name of the image file of anm18.gif.

The image receiving unit 130 receives a corresponding image file through a network using the path and the name which have been extracted in operation S220 (operation S230). If the image size or the image file size is not specified in the source of the web language read in at operation S210, the image receiving unit 130 can recognize the image size or the image file size by receiving the image file in operation S230.

The display unit 140 displays the image file received in operation S230 (operation S240). If the image size or the image file size is recognized when the image file is received in operation S230, the display unit 140 displays only the image file within the range of the image sizes or the image file sizes stored in the reference data storage unit 150.

The input unit 160 receives the selected image files to be printed out of the displayed images (operation S250). FIG. 5A and FIG. 5B are views illustrating an operation panel 360 according to an embodiment of the present general inventive concept useable in the method of FIG. 3. In FIGS. 5A and 5B, a user can select an image file that the user wants to print through the operation panel 360, looking at the image files displayed on a display panel, such as an LCD panel 400. For example, browsing fifteen image files selected on the basis of the image size or the image file size by using a previous button 361 or a next button 363, the user can select an image file that he or she wants to print by pressing a selection button 362.

The printing unit 170 prints the selected image file (operation S260).

Figure 4A:
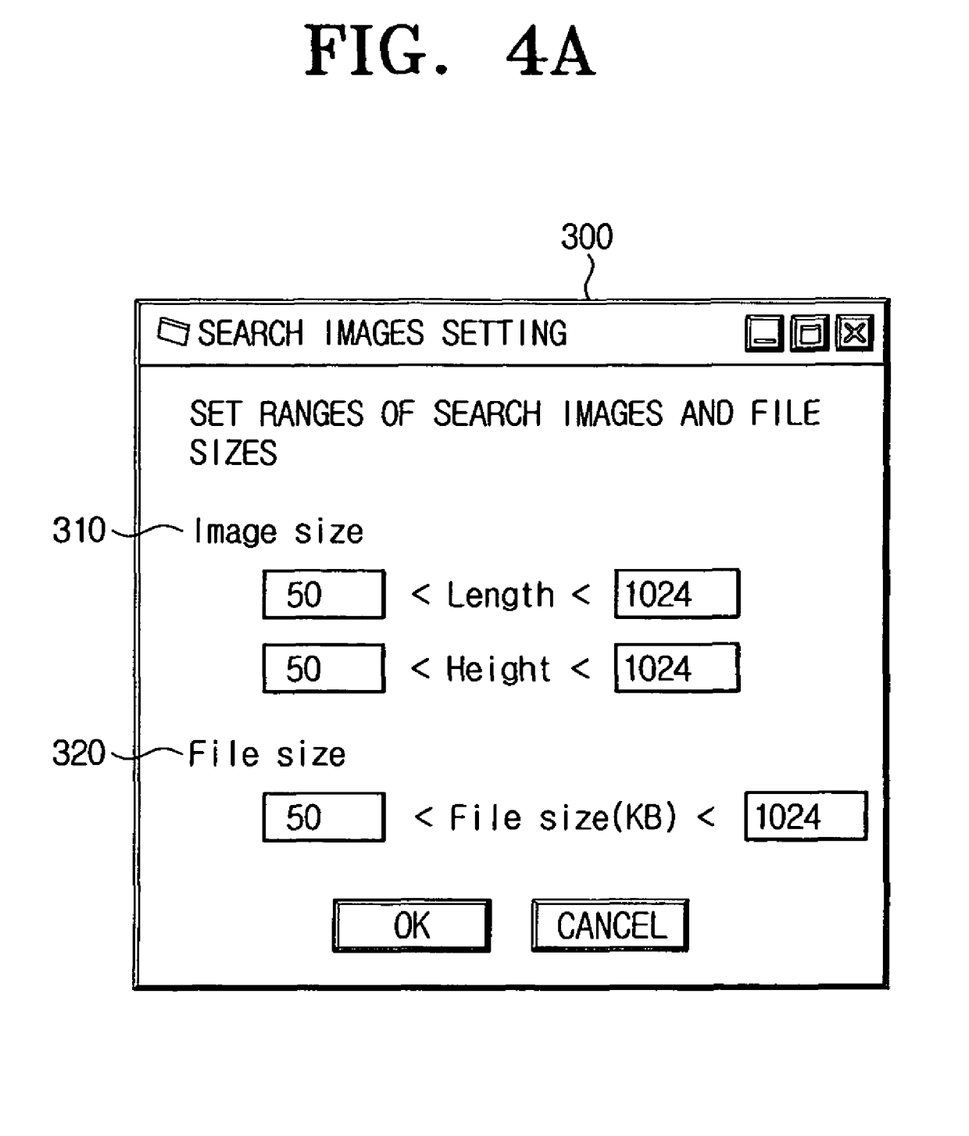
FIG. 4A and FIG. 4B are views illustrating user interfaces according to embodiments of the present general inventive concept.
Figure 4B:
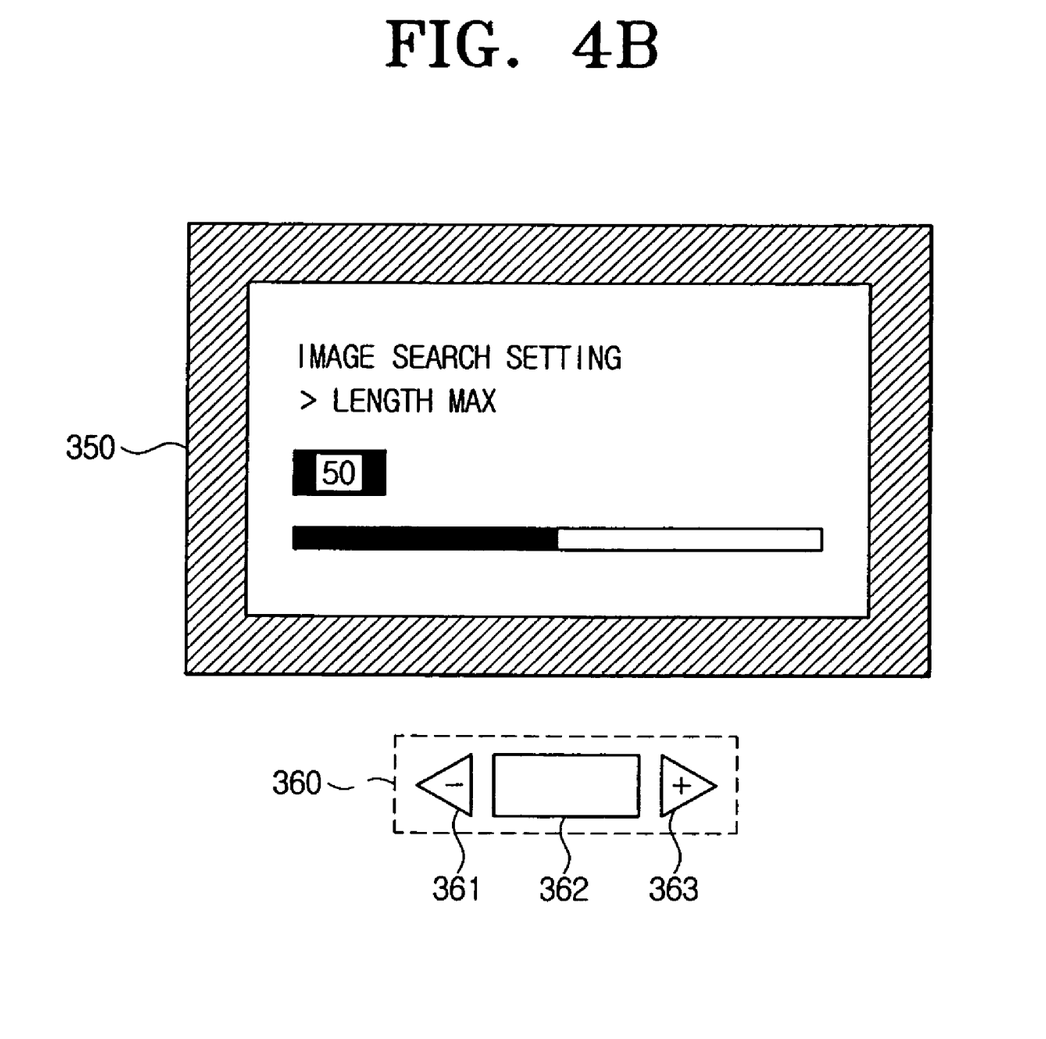

FIG. 4A and FIG. 4B are views illustrating user interfaces 300 and 350 according to embodiments of the present general inventive concept. Description will be made of a method of setting the reference data with reference to FIGS. 2, 4A, and 4B.

A user interface 300 to enable a user to setup reference data can be provided on the image forming apparatus 100 or a host (not illustrated) to control the image forming apparatus 100. A user can set an image size range 310 and an image file size range 320 by entering numbers as illustrated in FIG. 4A. If the image forming apparatus 100 is not provided with number buttons, the user can set the ranges through an operation panel 360, viewing a user interface 350, for example, using a previous button 361, a next button 363, and a selection button 362, as illustrated in FIG. 4B.

Various embodiments of the present general inventive concept can be embodied as computer readable codes on a computer readable recording medium. The computer readable recording medium may include any data storage device suitable to store data that can be thereafter read by a computer system. Examples of the computer readable recording medium include, but are not limited to, a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Various embodiments of the present general inventive concept may also be embodied in hardware or in a combination of hardware and software.

As described above, according to embodiments of the present general inventive concept, an image forming apparatus can select and display images linked to a web page based on predetermined reference data, and a user can select and print desired images of the displayed images, so a user's convenience can be enhanced.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of searching for and printing images on a network in an image forming apparatus, the method comprising:
    receiving a network resources address at which a document exists;
    reading information on the document existing at the received address;
    determining whether an image file in the document information corresponds to predetermined reference data to determine whether to extract a path and a name of the image file from the document information, the predetermined reference data previously stored in the image forming apparatus, and the predetermined reference data is pre-set to exclude image files that are not in at least an image size range;
    extracting the path and the name of the image file from the document information when it is determined that the image file corresponds to the non-excluded image size range of the predetermined reference data;
    receiving the image file through the network using the extracted path and name of the image file; and
    printing the image file.

2. The method as claimed in claim 1, wherein the address comprises a uniform resource locator.

3. The method as claimed in claim 1, wherein the receiving of the network resourced address comprises:
    receiving the address through an input unit provided on either the image forming apparatus or a host connected to the image forming apparatus to control the image forming apparatus.

4. The method as claimed in claim 1, wherein the document information comprises a web language source encoding the document.

5. The method as claimed in claim 1, further comprising:
    receiving the reference data through an input unit provided on either the image forming apparatus or a host connected to the image forming apparatus to control the image forming apparatus.

6. The method as claimed in claim 1 wherein:
    the image file comprises a plurality of image files;
    the receiving of the image files comprises:
        displaying the received image files, and
        selecting one of the displayed image files to be printed; and
    the printing of the image file comprises printing the selected image file.

7. An image forming apparatus, comprising:
    an input unit to receive a network resources address at which a document exists;
    a web information receiving unit to read information on the document existing at the received address;
    an image path extracting unit to determine whether an image file including at least one an image size corresponds to predetermined reference data stored in the image forming apparatus to determine whether to extract a path and a name of the image file from the document information, and to extract the path and the name of the image file from the document information when the image file corresponds to an image size range of the predetermined reference data, the predetermined reference data being pre-set to exclude image files having images that are not in the image size range;
    an image receiving unit to receive the image file through the network using the extracted path and name of the image file; and
    a printing unit to print the image file.

8. The apparatus as claimed in claim 7, wherein the address comprises a uniform resource locator.

9. The apparatus as claimed in claim 7, wherein the document information comprises a web language source encoding the document.

10. The apparatus as claimed in claim 7, further comprising:
    a reference data storage unit to store the reference data as a reference to extract the path and name of the image file.

11. The apparatus as claimed in claim 7, wherein the input unit receives the reference data.

12. The apparatus as claimed in claim 7, further comprising:
    a display unit to display the received image file,
    wherein the input unit receives a selected image file of the displayed image files to be printed, and the printing unit prints the selected image file.

13. An image forming apparatus, comprising:
    a web information unit to obtain information on a document located at an input web address through a network;
    an image path extracting unit to determine whether one or more image files including at least one image size corresponds to predetermined reference data stored in the image forming apparatus to determine whether to extract a path and a name of the image file from the document information, the predetermined reference data set by a user to exclude image files that have images that are not in a predetermined image size range, and to extract the path and the name of the one or more image files in the document when it is determined that the one or more image files corresponds to the predetermined reference data previously stored in the image forming apparatus; and
    an image receiving unit to receive the one or more image files via the network after extracting the path and name of the one or more image files in the document
    wherein the reference data is reference data to exclude image files in a range determined by a user.

14. The image forming apparatus as claimed in claim 13, wherein the information comprises a web language source encoding the document.

15. The image forming apparatus as claimed in claim 13, wherein the information comprises a web page of the input web address and a source of a web language that constructs the web page.

16. The image forming apparatus as claimed in claim 13, wherein the image path extracting unit selects at least one image file of the one or more image files using the predetermined reference data, and extracts the path and the name of the selected at least one image file.

17. The image forming apparatus as claimed in claim 16, further comprising:
    a storage unit to store the predetermined reference data.

18. The image forming apparatus as claimed in claim 16, wherein the predetermined reference data comprises predetermined image file criteria such that image files that do not satisfy the predetermined image file criteria are excluded from being selected by the image path extracting unit.

19. The image forming apparatus as claimed in claim 18, wherein the predetermined image file criteria comprises a predetermined image file size range.

20. The image forming apparatus as claimed in claim 16, wherein the predetermined reference data comprises predetermined image criteria such that image files having images that do not satisfy the predetermined image criteria are excluded from being selected by the image path extracting unit.

21. The image forming apparatus as claimed in claim 20, wherein the predetermined image criteria comprises a predetermined image size range.

22. The image forming apparatus as claimed in claim 13, further comprising:
an image receiving unit to receive the one or more image files through the network using the path and name extracted by the image path extracting unit.

23. The image forming apparatus as claimed in claim 22, further comprising:
a display unit to display one or more images corresponding to the one or more image files received by the image receiving unit.

24. The image forming apparatus as claimed in claim 22, further comprising:
a printing unit to print one or more images corresponding to the one or more image files received by the image receiving unit.

25. The image forming apparatus as claimed in claim 13, further comprising:
an input unit to generate an interface to select reference data corresponding to at least one of the image size and the image file size,
wherein the image patch extracting unit selects one or more image files according to the reference data.

26. A method of receiving an image through a network using an image forming apparatus, the method comprising:
obtaining information on a document located at an input web address through the network;
determining whether an image size of one or more image files corresponds to predetermined reference data stored in the image forming apparatus to determine whether to extract a path and a name of the image file from the document information, the predetermined reference data set by a user to exclude image files that are not in at least a pre-set image size;
extracting the path and the name of the one or more image files in the document when it is determined that the one or more image files corresponds to the predetermined reference data and the information obtained by the web information unit; and
receiving the one or more image files through the network using the path and name extracted by the image path extracting unit.

27. The method as claimed in claim 26, wherein the information comprises a web language source encoding the document.

28. The method as claimed in claim 26, wherein the extracting of the path and name comprises:
selecting at least one image file of the one or more image files using the predetermined reference data; and
extracting the path and the name of the selected at least one image file.

29. The method as claimed in claim 28, further comprising:
storing the predetermined reference data.

30. The method as claimed in claim 28, wherein the predetermined reference data comprises predetermined image file criteria, and the selecting of the at least one image file comprises:
selecting at least one image file of the one or more image files that satisfies the predetermined image file criteria.

31. The method as claimed in claim 30, wherein the image file criteria comprises a predetermine image file size range, and the selecting of the at least one image file comprises:
selecting at least one image file having a size within the predetermined image file size range.

32. The method as claimed in claim 28, wherein the predetermined reference data comprises predetermined image criteria, and the selecting of the at least one image file comprises:
selecting at least one image file of the one or more image files having an image that satisfies the predetermined image criteria.

33. The method as claimed in claim 32, wherein the image criteria comprises a predetermine image size range, and the selecting of the at least one image file comprises:
selecting at least one image file having an image having a size within the predetermined image size range.

34. The method as claimed in claim 26, further comprising:
displaying one or more images corresponding to the received one or more image files.

35. The method as claimed in claim 26, further comprising:
printing one or more images corresponding to the received one or more image files.

36. A non-transitory computer readable recording medium including a computer readable code to perform a method of receiving an image through a network using an image forming apparatus, the method comprising:
obtaining information on a document located at an input web address through the network;
determining whether an image size of one or more image files corresponds to predetermined reference data stored in the image forming apparatus to determine whether to extract a path and a name of the image file from the document information, the predetermined reference data set by a user to exclude image files that are not in at least a pre-set image size range;
extracting the path and the name of the one or more image files in the document if the one or more image files corresponds to the predetermined reference data and the information obtained by the web information unit; and
receiving the one or more image files through the network using the path and name extracted by the image path extracting unit.

* * * * *